Sept. 18, 1934.    A. J. KILMER    1,974,215
CUTTING TOOL
Filed April 10, 1931
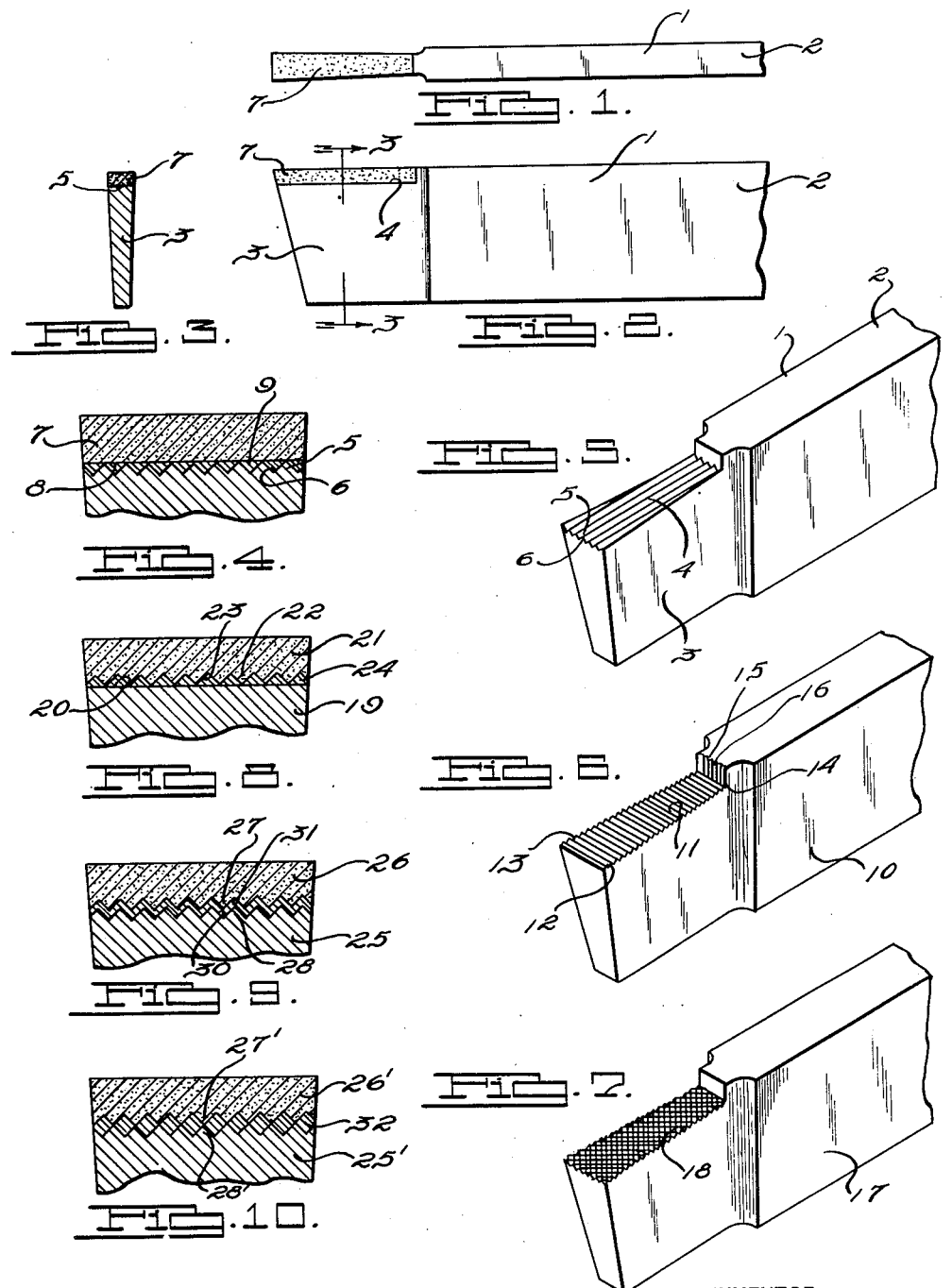
INVENTOR
Austin J. Kilmer.
BY
Harness, Dickey, Pierce & Hann
ATTORNEYS.

Patented Sept. 18, 1934

1,974,215

UNITED STATES PATENT OFFICE 1,974,215

CUTTING TOOL

Austin J. Kilmer, Roseville, Mich., assignor to Michigan Tool Company, a corporation of Michigan Application April 10, 1931, Serial No. 529,166

4 Claims. (Cl. 29—95)

This invention relates to an improved cutting tool of the type which includes a steel stock and a rigidly attached extremely hard cutting element.

Heretofore in securing cutting elements of the high speed cutting class comprising extremely hard materials, such as tungsten carbide, to steel stocks, it has been the practice to grind or otherwise finish the surfaces of the cutting element and stock which are to be placed together to a substantially perfect fit so as to obtain a large surface contact between the two members. Then the finished surfaces were coated with a bonding medium such as spelter or bronze and the parts were pressed together while at a temperature, at or slightly above, the melting point of the bonding medium with sufficient pressure to squeeze out any excessive bonding material.

The speeds at which cutting with tools of this kind is performed results in the development of high temperatures which tend to reduce the adhesion between the bonding material and the soft steel stock to such an extent as to frequently allow the cutting element to shift in position relative to the stock under the pressure of cutting or under the impact to which such tools are liable to be subjected. Generally the adhesion between tungsten carbide or other alloy cutting elements and the bonding material successfully withstands the temperatures which are created during operation of the tool, and failure occurs usually in the adhesion between the bonding medium and the stock of the tool.

The main objects of the invention are to provide improved means in a composite cutting tool for securing a hard cutting element against shifting relative to the tool stock under high speed cutting, and the accompanying high temperature operation of the tool; to provide means of this kind which is particularly adapted for preventing releasing of the adhesion between a tungsten carbide or other non-ferrous cutting element and the bonding material between it and a steel tool stock; to provide a tool stock which has surfaces for receiving a cutting element that are of substantially greater area than the corresponding cross sectional area of the cutting element; and to provide a recess in a steel tool stock for receiving a cutting element of this kind, which recess is provided with serrated, knurled or otherwise roughened surfaces having sufficient area to compensate for the deficiency in adhesion between the bonding medium disposed between it and the material of the stock, with respect to the adhesion between the cutting element and the bonding medium.

Further objects of the invention are to provide staggered serrations in the cutting element and stock of a tool of this kind for augmenting the areas of the registering surfaces of these parts so as to permit the formation of a rigid bond therebetween; to provide serrated surfaces on the parts of a tool of this character which may be partially interengaged so as to prevent shifting of the cutting element in predetermined directions, and to provide knurled registering surfaces on the cutting element and stock of a cutting tool respectively for presenting comparatively large registering areas to the bonding material.

An illustrative embodiment of the invention is shown in the accompanying drawing, in which:

Fig. 1 is a plan view of a cutting tool embodying my invention.

Fig. 2 is a side elevation of the tool shown in Fig. 1.

Fig. 3 is a transverse vertical section taken on line 3—3 of Fig. 2.

Fig. 4 is an enlarged fragmentary section, similar to Fig. 3, showing in detail, an improved bond between the stock and cutting element of a cutting tool.

Fig. 5 is a fragmentary perspective view of the tool stock illustrated in Figs. 1 to 4, inclusive.

Fig. 6 is a fragmentary perspective view of a tool stock illustrating surfaces for receiving a cutting element which embody a modified form of the invention.

Fig. 7 is a fragmentary perspective view of a tool stock showing knurled surfaces for receiving a cutting element.

Fig. 8 is an enlarged section, similar to Fig. 4, but illustrating a further development of the invention.

Fig. 9 is a view similar to Figs. 4 and 8 but showing a still further development of the invention.

Fig. 10 is an enlarged fragmentary section of a cutting tool illustrating a still further development of the invention.

All of the forms of the cutting tool shown in the drawing include a stock which is formed of comparatively soft steel, or other suitable inexpensive metal having a substantially rectangular shank portion for attachment to a fixture or other part of a metal working machine.

In the form shown in Figs. 1 to 5, inclusive, the stock 1 has a shank 2 and a forward end portion 3 in the upper side of which is formed a recess 4 having a plurality of spaced, substantially V-shaped ridges 5 in its floor or lower side which are separated by serrations 6. Seated in the recess 4 is an extremely hard, high speed cutting element 7, preferably comprising tungsten carbide or other alloy having similar desirable properties, which has a substantially planular lower surface 8 registering with the serrated floor of the recess 4. The serrations of the lower side of the recess are filled with a bonding medium 9, such as spelter, copper or any other suitable material, which is rigidly bonded to the lower surface 8 of the cutting element and to the inclined surfaces of the sides 5 on the stock. The side surfaces of the ridges present an area for the bonding material to adhere to, which is substantially larger than the area of the registering surface of the cutting element. The enlarged area of the floor of the recess causes a bond to be formed between the spelter and the stock 1 which is equal in strength to, or greater than the strength of the bond between the cutting element 7 and the spelter, it being understood that spelter generally adheres more strongly to tungsten carbide and similar alloys than to steel of the type used in tool stocks.

In the form shown in Fig. 6 the tool stock 10 is provided on its upper side with a recess 11 having a lower side or floor on which transversely extending V-shaped ridges 12 are formed. These ridges are separated by serrations 13. Formed in the end wall 14 of the recess 11 are vertical ridges 15 which are separated by serrations 16. A cutting element (not shown in Fig. 6) may be placed in the recess 11 and secured to the floor and end wall 14 of the recess by suitable bonding material, such as spelter. With this form of my invention, the areas of both the floor and end wall of the recess are substantially larger than the areas of the corresponding surfaces of the cutting element, thereby effecting a better bond between the two parts.

In Fig. 7 is illustrated a tool stock 17 having a recess 18 at the forward end portion of its upper side for receiving a cutting element of the type shown in Fig. 2 and designated by the numeral 7. The floor or lower wall of the recess 18 in this embodiment of the invention is knurled so as to render its surface greater in area than the area of the corresponding side of the cutting element.

In the form of the invention shown in Fig. 8 a tool stock 19 is provided with a smooth substantially planular surface 20 on which is received a cutting element 21. Formed on the side of the cutting element 21 which is received by the planular surface 20 is a plurality of ridges 22. Located between the ridges are serrations 23 which are filled with a bonding material 24 like spelter. The spelter is rigidly bonded to the planular surface 20 of the tool stock and to the inclined sides of the ridges.

In the form shown in Fig. 9 the registering surfaces of the tool stock 25 and cutting element 26 are provided with staggered complementary ridges 27 and 28 between which is located a capillary film of suitable bonding material. In mounting the cutting element 26 on the stock 25 the ridges 27 of the cutting element are placed in alignment with the serrations 30 between the ridges 28 of the stock and the ridges 28 of the stock are placed in alignment with the serrations 31 between the ridges 27 of the cutting element while a generous layer of spelter is present on one or both of the ridged surfaces. Then the cutting element and stock are compressed together while they are heated above the melting point of the spelter so as to squeeze out the excess spleter. The parts are then allowed to cool while they are firmly clamped together.

In the form shown in Fig. 10 the tool stock 25' and tungsten carbide cutting element 26' are each provided on their registering surfaces with ridges 27' and 28', respectively, which are located in vertical alignment with each other. The grooves formed between these registering ridges are filled with spelter 32 which is rigidly bonded to the inclined surfaces thereof.

In all the forms of my invention the surfaces of at least one of the parts at which adhesion is desired are roughened or otherwise formed so as to present enlarged areas to the bonding material whereby to mechanically resist shifting of the cutting element relative to the tool stock. The surface of the steel tool stock is preferably ridged or roughened so as to increase its area with respect to the registering surface of the cutting element when the latter is formed of tungsten carbide since failure in the attachment of the cutting element to the tool stock occurs in the adhesion of the bonding medium to the steel of the stock. By increasing the area of the cutting element receiving surface of the stock the deficiency in adhesion between the bonding medium and the material of the stock is compensated for.

Although but several specific embodiments of this invention have been herein shown and described, it will be understood that numerous details of the construction shown may be altered or omitted without departing from the spirit of this invention as defined by the following claims.

I claim:

1. A cutting tool including a stock comprising a metal bar, a hard high-speed cutting element having a side thereof adjacent one side of said bar, one of the adjacent sides of said stock and cutting element being provided with a plurality of alternate protruding portions and depressions and the other of said adjacent sides being in contact with the outer extremities of said protruding portions, and bonding material in said depressions and surface bonded to the adjacent sides of said stock and cutting element respectively.

2. A cutting tool including a stock comprising a metal bar, a hard high-speed cutting element having a side thereof adjacent one side of said bar, one of the adjacent sides of said stock and cutting element being provided with a plurality of alternate ridges and grooves, and the other of said adjacent sides being in contact with the outer extremities of said ridges, and bonding metal in said grooves and surface bonded to the adjacent sides of said stock and cutting element respectively.

3. A cutting tool including a stock comprising a steel shank having a plurality of alternate depressions and protruding portions on one side, bonding metal in said depressions and surface bonded to the metal of said stock, and a hard high-speed cutting element having a reference surface contacting with the outer extremities of said protruding portions and bonded to the metal in said depressions.

4. A cutting tool including a stock comprising a steel shank having a recess in one side thereof and having a plurality of grooves and alternate ridges extending into said recess, bonding metal in said grooves substantially flush with the outer extremities of said ridges and surface bonded to the sides of said ridges, and a high speed cutting element comprising tungsten carbide disposed in said recess and having one side thereof contacting with the outer extremities of said ridges and bonded to the metal in said grooves.

AUSTIN J. KILMER.